Aug. 16, 1966   C. E. LEE   3,266,584
VEHICLE WEIGHING SCALE WITH OVERLAPPED LOAD BEARING PLATES
Filed May 3, 1965   2 Sheets-Sheet 1
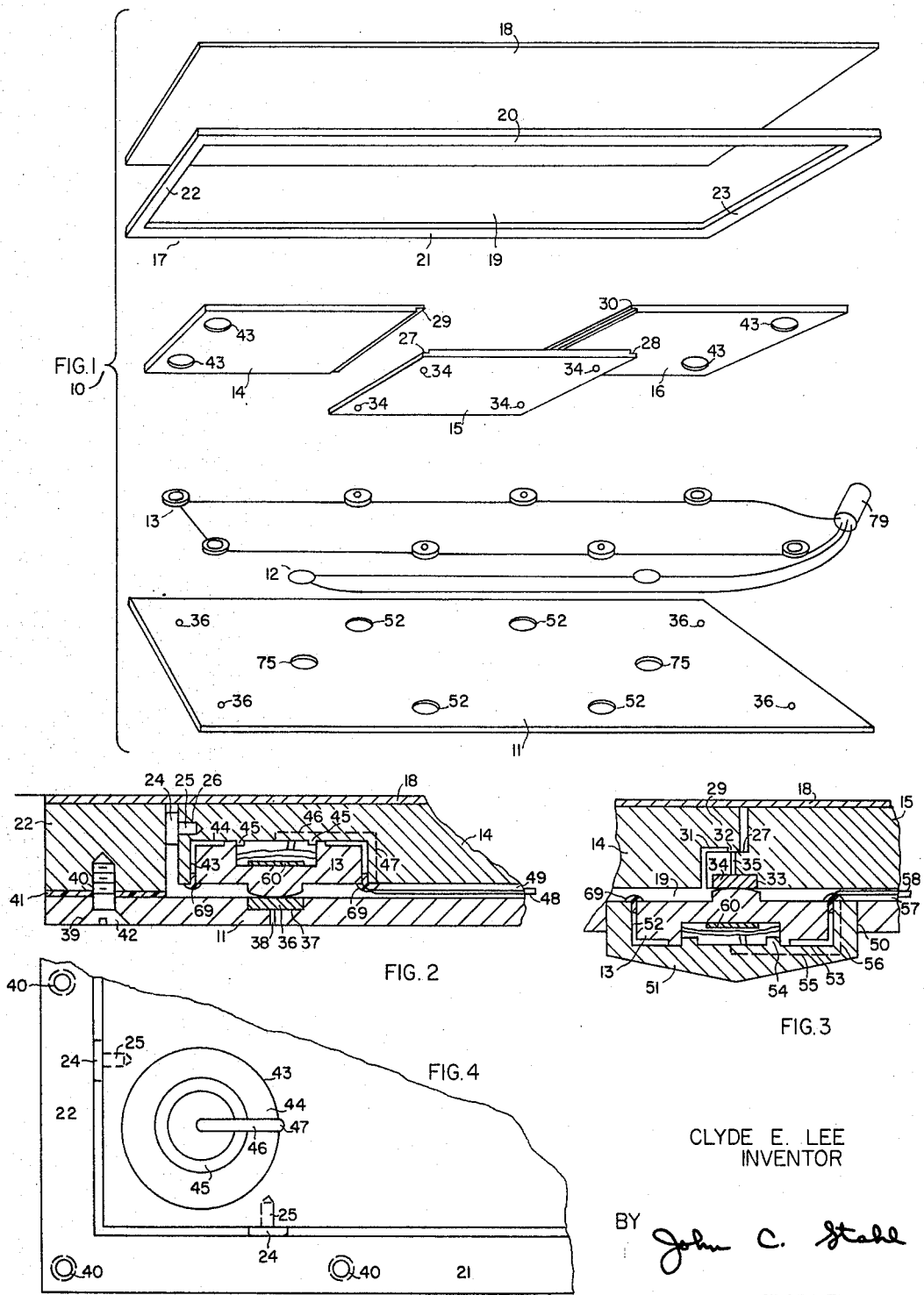
CLYDE E. LEE
INVENTOR
BY John C. Stahl
ATTORNEY Aug. 16, 1966  C. E. LEE  3,266,584
VEHICLE WEIGHING SCALE WITH OVERLAPPED LOAD BEARING PLATES
Filed May 3, 1965  2 Sheets-Sheet 2
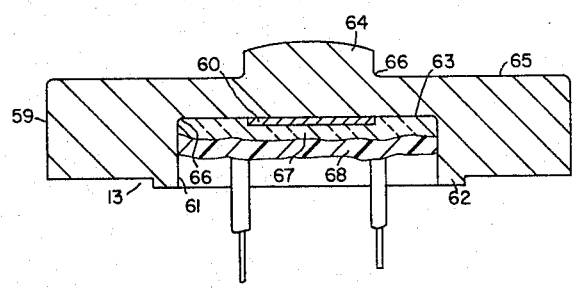
FIG. 5
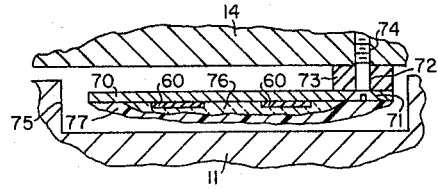
FIG. 6
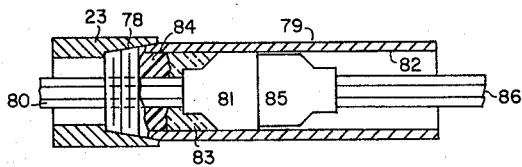
FIG. 7
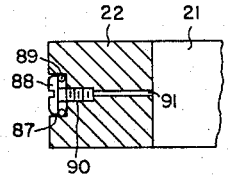
FIG. 8
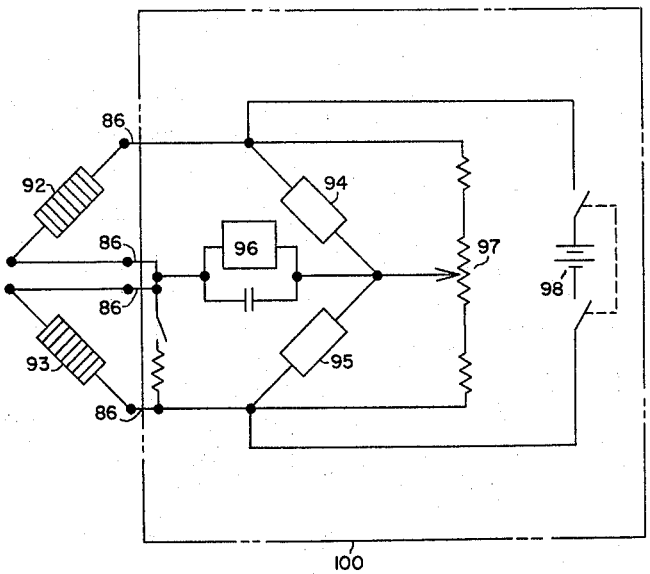
FIG. 9
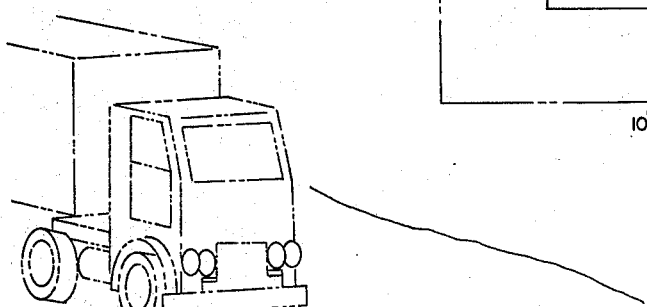
FIG. 10
CLYDE E. LEE
INVENTOR
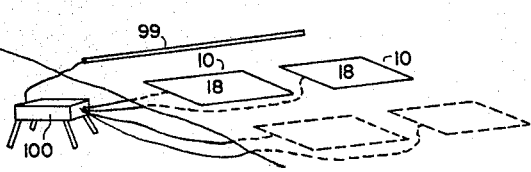
ATTORNEY 3,266,584
VEHICLE WEIGHING SCALE WITH OVER-
LAPPED LOAD BEARING PLATES
Clyde E. Lee, 2201 Winsted Lane, Austin, Tex.
Filed May 3, 1965, Ser. No. 452,584
5 Claims. (Cl. 177—134)

The present invention relates to a weighing device and more particularly to such a device for rapidly weighing standing or moving vehicles.

Prior to the present invention there was no scale or weighing device which could easily be installed in a roadway and which was capable of accurately measuring the weight of a vehicle traveling at speeds ranging from zero to seventy miles per hour. The portable, light, weight, weighing device of the subject invention is designed to be installed in a traffic lane of a highway or the like with a minimum of effort and measures the magnitude of a load acting normal to the surface of the said weighing device. The output signal produced by such load is not affected by tractive forces nor by the position of the load on the said device. Furthermore, all temperature effects are cancelled.

An object of the present invention is the provision of a portable weighing device which is capable of accurately sensing the weight of vehicles traveling at speeds ranging from zero to seventy miles per hour.

Another object is to provide a light weight weighing device which may easily be installed in the traffic lane of a highway with a minimum of effort and minimum damage to the roadway.

A further object of the invention is the provision of a light weight device which is sensitive to the normal component of a load applied by the pneumatic tires of a vehicle passing thereupon.

Still another object is to provide such a scale wherein all temperature effects are cancelled.

A final object of the subject invention is the provision of such a device which is portable yet withstands rugged use, may be used in all conditions of weather, and is capable of mass production techniques.

Other objects and features of the invention will become apparent to those skilled in the art as the disclosure is made in the following detailed description of preferred embodiments of the invention as illustrated in the accompanying sheets of drawing in which:

FIG. 1 is an exploded, pictorial view of the subject invention.

FIG. 2 is a fragmentary, vertical sectional view of the outermost portion of the subject invention taken along the longitudinal axis thereof.

FIG. 3 is a fragmentary, vertical sectional view through the approximate medial portion of the subject invention taken along the longitudinal axis thereof.

FIG. 4 is a fragmentary, bottom plan view of a corner of the invention with the base removed.

FIG. 5 is a greatly enlarged vertical sectional view taken along the longitudinal axis of a load transducer utilized in the practice of the invention.

FIG. 6 is a vertical sectional view taken along the longitudinal axis of a temperature compensating gage utilized in the practice of the invention.

FIG. 7 is a vertical sectional view taken through an end of the frame.

FIG. 8 is a vertical sectional view taken along the longitudinal axis of a connector secured in an end of the frame.

FIG. 9 is a schematic diagram of a bridge circuit and instrumentation utilized in connection with the subject invention.

FIG. 10 is a pictorial representation of the subject invention installed in a traffic lane of a highway or the like.

Referring now to the drawings, wherein like reference characters designate like or corresponding parts throug out the several views, there is shown in FIG. 1 an e ploded, pictorial view of the weighing device 10 of t subject invention consisting, in general, of base 11, te: perature compensating gages 12, load transducers 1 plates 14–16, frame 17 and diaphragm 18.

More particularly, base 11 is rectangular in plan a preferably constructed of one-quarter inch plate. Frai 17 corresponds in plan to base 11 and includes thereir longitudinally aligned, rectangularly shaped opening which is bounded by sides 20–21 and ends 22–23, resp tively, preferably of the same width. The frame is tachably secured to base 11 in a manner hereinafter to described in connection with FIG. 2 of the drawin Diaphragm 18 is of thin gauge sheet metal, correspor to the frame in plan, and is secured to the sides and er of the frame as by conventional techniques which provi a permanent, water and air tight seal.

The opening 19 heretofore mentioned accommoda the structural steel plates 14–16; the flat, upper surf: of the said plates bear against the lower surface of d phragm 18 (see FIGS. 2 and 3) and the said plates supported in such position by means of a plurality longitudinally and laterally aligned, spaced, load tra ducers 13 as well be described in further detail. Lon tudinal and lateral movement of the plates 14–16 is mi mized by means of spacers 24 placed in the vertical si and ends of plates 14–16 in proximity to each corr thereof; the heads of the spacers bear lightly against t corresponding portions of the frame. Spacers 24 are p ferably of nylon, brass, or the like and include an in grally formed shank 25 which inserts into a horizonta extending bore 26 in the outermost vertical surfaces the respective plates as best seen in FIGS. 2 and 4 the drawings.

A lap-type joint is provided between plates 14, 15 a 15, 16 respectively whereby the side plates 14, 16 are s ported along such lap joint by the center plate 15. Mc specifically, the ends of center plate 15 are milled otherwise provided with transversely extending should 27–28 which accommodate mating members 29–30 on t innermost ends of side plates 14 and 16. For purpo: of convenience only, the lap-type joint formed betwe plates 14, 15 will be described; the joint formed betwe plates 15, 16 (not shown) is a mirror image thereto. best seen in FIG. 3 of the drawings, a laterally extendi groove 31 is provided in the lower surface of member inwardly of the end of side plate 14, forming a latera extending, downwardly depending projection 32; the s projection bears against the shoulder 27 and acts as a f crum for side plate 14. A load transducer 13 suppo each corner of center plate 15; the laterally aligned lc transducers supporting one end of the center plate 15 centered vertically beneath the approximate center of p jection 32 on side plate 14 while the laterally aligned lc transducers supporting the opposite end of center plate are centered vertically beneath the corresponding proj tion on side plate 16.

As illustrated in FIG. 3 of the drawings, a recess is provided in the undersurface of each corner of center plate 15, each such recess accommodates an ins 34 against which bears the respective load transdu heretofore mentioned and which is secured in base Each insert 34 is secured in the corresponding recess as by an adhesive such as epoxy cement or the li the said inserts are preferably one-half inch in diamet one-eighth inch in thickness, composed of steel and hardened to Rockwell C–60 as by conventional methods. The lower end of a vertical bore 35 communicates with recess 33 while the upper end thereof terminates in the respective shoulders 27, 28 whereby excess adhesive is extruded as the insert is secured in the said recess.

In FIG. 2 there is shown an insert 36 which is placed in each corner of the upper surface of base 11; such inserts are vertically aligned with respect to certain load transducers positioned in the outermost corners of the lower surface of side plates 14 and 16, respectively, which load transducers bear against the corresponding inserts in the base. A circular recess 37 is provided in the upper surface of base 11; a bore 38 communicates with the said recess 37 and passes through the base whereby excess adhesive may be extruded when the insert 36 is positioned therein. Each of the inserts 36 are similar in construction to the inserts 34 heretofore described in detail.

Referring again to FIG. 2 of the drawings, there is shown one of a plurality of vertically aligned, countersunk bores 39 in the marginal portions of base 11 and aligned female threaded portions 40 (see FIG. 4) in the lower surface of the sides and ends 20–23 of the frame. A neoprene gasket 41 or the like is placed between the base and frame and a machine screw 42 inserted into the corresponding threaded portion. Gasket 41 aids in maintaining the subject invention water and air tight.

As best seen in FIG. 4, circular recesses 43 are provided in the lower surface of each outer corner of side plates 14, 16 respectively to receive certain of the load transducers 13; such recesses keep the over-all thickness of the weighing apparatus to a minimum. Base 44 of each such recess includes an integrally formed, downwardly depending annular ring 45 which is concentric with respect to the said recess; a radially extending groove 46 is milled into the said base 44, the said groove passes through ring 45 and communicates with a downwardly extending groove 47 in the side of the said recess; electrical leads 48–49 connecting to the strain gages secured in the load transducers which support the side plates 14, 16 pass through the said grooves 46, 47.

A plurality of laterally aligned bores 50 are provided in base 11, the center of each of the said bores is vertically aligned with respect to the inserts 34 in the center plate 15. In FIG. 3 there is shown a machined disc 51 of cold-rolled steel or the like which fits into each of said plurality of bores 50 in such a manner that the upper surface thereof is aligned with respect to the upper surface of base 11 and is secured in such position as by welding or the like. A circular recess 52 is provided in each such disc; base 53 of said recess includes an integrally formed, upwardly extending annular ring 54; a radially extending groove 55 passes through the ring 54 and communicates with an upwardly extending groove 56 in the side of recess 52; grooves 55, 56 accommodate the electrical leads 57–58 connecting to strain gages positioned in each of the load transducers which support center plate 15.

There is shown in FIG. 5 a load transducer 13 of the type positioned in recess 43 in each outer corner of the lower surface of side plates 14 and 16, and also positioned in recess 52 provided in disc 51 which is secured in the base 11. In the preferred embodiment of the invention a total of eight such load transducers support plates 14–16. It is to be understood, however, that any desired number of plates may be utilized; furthermore, such plates may be of any geometrical configuration as long as a lap-type joint is used to support adjacent plates and a load transducer is positioned vertically beneath each interior angle of such plates to support the same.

Each of said load transducers 13 consist of a disc 59 and strain gage 60 secured therein. The disc 59 is machined from Graph-Mo steel or the like with all such discs utilized in a specific unit as nearly identical as the state of the art permits. Disc 59 is circular in plan, includes a central recess 61 approximately one-half the diameter of the disc 59 which recess extends upwardly approximately one-half the over-all height of the said disc. An annular ring 62 is provided about recess 61 as by removing the laterally extending portions of the base. The inside diameter of recess 61 is slightly greater than the outside diameter of rings 45 and 54 heretofore mentioned which rings 45, 54 accommodate the ring 62 of load transducer 13 in a loose fit. Recess 61 terminates upwardly in a flat diaphragm 63 upon which each strain gage 60 is secured.

Disc 59 further includes an integrally formed, centrally positioned, cylindrical button 64 which extends above the top 65 of the said disc; the upper end of said button is convex. To prevent stress concentrations in such disc, a fillet, indicated generally by 66, is provided in the angle formed between top 65 and button 64, and recess 61 and diaphram 63, respectively. After machining, the disc 59 is heat treated to bring its hardness to Rockwell C–60 after which it is stress relieved, as by conventional methods.

Still referring to FIG. 5 of the drawings, there is shown a strain gage 60, preferably of the center spiral, etched-foil resistance type manufactured by Baldwin-Lima-Hamilton Corporation of Waltham, Massachusetts, and indentified as type FAS–50–12 S6. It is that the invention is not restricted solely to such type strain gage but also includes any desired etched-foil configuration and also any transducer including a linear output signal with respect to load. In practice, it has been found advantageous to select strain gages from the same lot for use in a specified unit. The epoxy backing of each such strain gage is abraded with a fine abrasive to remove gloss, after which the gage 60 is centered on the diaphragm 63 and maintained in such position as by means of a jig or the like while the adhesive is curing. Preferably, epoxy cement, manufactured by the aforementioned manufacturer of the strain gages and identified as EPY–150 is used to secure gage 60 to the diaphragm 63.

Each such load transducer 13 is then made moisture proof by first coating the strain gage 60 and diaphragm 63 with a layer 67 of melted Di-Jell wax or the like and then sealing the entire diaphragm area with RTV silicone rubber, indicated by reference numeral 68.

The electrical leads connecting to each strain gage pass outwardly of each load transducer through the grooves 46, 47 and 55, 56 heretofore described in connection with FIGS. 2 and 3 of the drawings.

After the load transducers 13 are positioned in the recesses 43 and 52, a bead 69 (see FIGS. 2 and 3) of RTV silicone rubber or the like is used to seal each of the said transducers in their respective recesses.

Referring now to FIG. 6, there is shown a temperature compensating gage 12. Specifically, each of said gages consists of a flat disc 70 of the same composition as the disc 59 and which is attached to the lower surface of side plates 14 and 16. A countersunk bore 71 is provided in the marginal portion of said disc 70; a machine screw 72 is passed through bore 71 and a washer 73 placed thereon prior to being installed into female threaded member 74 in the undersurface of side plates 14, 16. A recess 75 is provided in the upper surface of base 11 vertically beneath the respective temperature compensating gages 12 to accommodate the same.

Four strain gages 60 of the type heretofore mentioned are placed upon the undersurface of each disc 70 at the cardinal points and bonded thereto in the manner heretofore described in connection with FIG. 5. A layer 76 of Di-Jell wax or the like and an encapsulating layer 77 of RTV silicone rubber covers the undersurface of the said disc 70.

There is shown in FIG. 8 of the drawings means whereby a plurality of electrical leads secured at one end to the respective strain gages in the load transducers and the temperature compensating gages pass outwardly of the weighing device 10. A female threaded portion 78 is provided in end 23 of the frame to receive the mating threaded member on nipple 79. Electrical leads 80 pass through portion 78 and are secured to one member 81 of a quick disconnect connector such as is well known; the member 81 and outermost ends of the leads 80 are secured in the bore 82 of said nipple as by means of a layer 83 of Di-Jell wax or the like and an encapsulating layer 84 of epoxy cement or the like. A mating member 85 inserts into bore 82 and detachably connects to member 81. Electrical leads 86 connect to member 85 and pass outwardly of the weighing device.

After the weighing device 10 is assembled, all air is purged therefrom by circulating nitrogen gas through the device. Preferably a port is provided in each side 22, 23 of the frame in proximity to diagonally extending corners of the frame for the introduction of such gas. As illustrated in FIG. 7, a circular recess 87 is provided in each vertical surface of ends 22, 23; the said recess preferably is of sufficient diameter and depth to accommodate the head of a machine screw 88. The said screw carries an O-ring 89 and inserts into a female threaded portion 90; a horizontally extending bore 91 communicates with the end of female threaded portion 90 and the opening 19 within the frame. A source of nitrogen gas is attached in a conventional manner to one port and exhausted out the port on the opposite side of the frame, after which the ports are sealed by means of the screws 88.

In FIG. 9 of the drawings there is shown a schematic diagram of a bridge circuit and accompanying apparatus used in combination with the weighing device 10 of the subject invention. As heretofore described in detail, a total of eight load transducers 13 and eight temperature compensating gages 12 are utilized in the practice of the subject invention; the said load transducers are calibrated under static load and those transducers with exactly the same response to loading are selected as it is important that the output signal from all of the load transducers be the same for any given load. The load transducers 13 are series connected and form the active arm 92 of the bridge circuit; the total change in resistance (output signal) will be the same whether the load is carried by one cell or a plurality of such cells. In the said bridge circuit, the eight temperature compensating gages 12 are connected in series as an adjacent arm 93 of the bridge, thus all temperature effects are cancelled. The load transducers 13 and temperature compensating gages 12 are positioned in the weighing device 10 of the subject invention in the manner heretofore described; electrical leads 86 connect thereto and pass outwardly to connect with bridge completion arms 94-95 and commercially available instrumentation 96 such as an oscilloscope or the like which responds to and indicates the magnitude of differences of potential in the range of zero to five millivolts. A bridge balancing circuit indicated generally at 97 and direct current power supply 98 connect across the bridge thus formed.

It is understood that four of the strain gages secured in four of the load transducers may constitute one active arm of the bridge with the remaining four strain gages in the load transducers constituting the other active arm and connected in parallel thereto. Arms of the bridge adjacent to the active arms of the bridge each consist of four temperature compensating strain gages whereby all temperature effects are compensated. In such embodiment, the bridge balancing circuit and instrumentation are external to the weighing device.

As shown in FIG. 10, two of the weighing devices of the subject invention are longitudinally aligned with the innermost ends thereof spaced approximately two feet apart; the said units are positioned in a traffic lane with the upper surface of diaphragm 18 flush with the road surface. A detector 99 which initiates the instrument package 100 is placed parallel to and spaced a predetermined distance from the first pair of such aligned weighing devices 10. Since the over-all thickness of the weighing apparatus 10 is only slightly greater than one inch, a minimum amount of paving material must be removed from the roadway for the installation of the subject invention; in reinforced concrete pavements, such device may be installed without cutting into the reinforcing steel.

As shown in dotted lines in FIG. 10 of the drawings, any desired number of pairs of such devices may be positioned in the roadway at predetermined intervals in similar manner.

Tractive forces acting parallel to the surface of the sheet metal diaphragm 18 are transmitted by the said diaphragm to the frame 17 and do not affect the output of the load transducers. Forces acting perpendicular to the surface of the sheet metal diaphragm deflect the diaphragm slightly and are transmitted to the plates 14–16 and are measurable in the manner heretofore described.

It is to be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A weighing device comprising a frame including a top and a bottom, an opening in said frame, a base secured to the bottom of said frame and a diaphragm secured to the top of said frame, a plurality of plates positioned in said opening and bearing against said diaphragm, a lap joint between adjacent plates of said plurality of plates, a plurality of load transducers supporting each of said plurality of plates, temperature compensating means connected to selected plates of said plurality of plates, and indicator means connected to said load transducers and temperature compensating means.

2. A weighing device comprising a rectangular frame including a top and a bottom, a rectangular opening in said frame, a base secured to the bottom and a flexible diaphragm secured to the top of said frame, a plurality of plates positioned in said opening and bearing against said diaphragm, a lap joint between adjacent plates of said plurality of plates, a plurality of load transducers supporting each of said plurality of plates, temperature compensating means attached to selected plates, and indicator means connected to said load transducers and temperature compensating means.

3. A weighing device comprising a rectangular base, a frame detachably secured to said base, a rectangular opening in said frame, a flexible diaphragm fixedly secured to said frame, a plurality of plates in said opening, a plurality of load transducers supporting each of said plates, a lap joint between adjacent plates, said plates bearing against said diaphragm, temperature compensating means secured to selected plates, means to maintain said weighing device water and air tight, and indicator means connected to said load transducers and temperature compensating means.

4. A first and a second weighing device embedded side-by-side in spaced relation in the traffic lane of a roadway, said first and second weighing device each comprising a rectangular frame, a base secured to said frame, a rectangular opening in said frame, at least three plates positioned in said opening, a lap joint between adjacent plates, a plurality of load transducers supporting each outer corner of the outermost plates of said plurality of plates and each corner of the innermost plates of said plurality of plates, temperature compensating means connected to selected plates, a diaphragm secured to said frame, said plates bearing against said diaphragm, and indicator means connected to said load transducers and temperature compensating means.

5. A first and second weighing device embedded side-by-side in spaced relation in the traffic lane of a roadway, said first and second weighing device each comprising
    a rectangularly shaped frame,
    a base secured to said frame,
    an opening in said frame,
    first, second, and third plates in said opening,
    a lap joint between the first and second and the second and third plates respectively,
    a plurality of load transducers positioned in the outermost corners of said first and third plates and bearing against the base,
    a load transducer positioned in the base and supporting each corner of said second plate,
    temperature compensating means connected to selected plates,
    and indicator means connected to said load transducers and temperature compensating means.

References Cited by the Examiner

UNITED STATES PATENTS

| | | | |
|---|---|---|---|
| 2,582,886 | 1/1952 | Ruge | 177—211 X |
| 2,764,399 | 3/1956 | Porter | 177—211 X |
| 2,901,235 | 8/1959 | Bradley | 177—211 |
| 2,962,274 | 11/1960 | Thurston | 177—134 X |
| 3,072,209 | 1/1963 | Perry | 177—253 X |
| 3,153,460 | 10/1964 | Raskin | 177—133 |

FOREIGN PATENTS

| | | |
|---|---|---|
| 139,070 | 10/1950 | Australia. |
| 468,718 | 10/1950 | Canada. |

OTHER REFERENCES

German application, 1,103,040, Carl Schenck, printed March 23, 1961 (Kl 42 F8).

RICHARD B. WILKINSON, *Primary Examiner.*